(12) United States Patent
Liang

(10) Patent No.: US 7,735,669 B2
(45) Date of Patent: Jun. 15, 2010

(54) MODULAR CASE ASSEMBLY DEVICE

(75) Inventor: Chien-Fa Liang, Chung-Ho (TW)

(73) Assignee: Super Micro Computer Inc., San Jose, CA (US)

( * ) Notice: Subject to any disclaimer, the term of this patent is extended or adjusted under 35 U.S.C. 154(b) by 1140 days.

(21) Appl. No.: 11/358,125

(22) Filed: Feb. 22, 2006

(65) Prior Publication Data
US 2007/0194021 A1     Aug. 23, 2007

(51) Int. Cl.
B65D 6/28       (2006.01)
(52) U.S. Cl. .................. 220/4.21; 220/4.02; 312/223.2
(58) Field of Classification Search ............... 220/4.21, 220/4.02, 4.28, 4.22; 312/223.1, 223.2, 223.3
See application file for complete search history.

(56) References Cited

U.S. PATENT DOCUMENTS

| | | | | |
|---|---|---|---|---|
| 3,506,322 | A * | 4/1970 | Richards | 312/108 |
| 3,950,603 | A * | 4/1976 | Brefka | 174/544 |
| 4,585,122 | A * | 4/1986 | Stegenga | 361/748 |
| 4,652,969 | A * | 3/1987 | Stegenga | 361/694 |
| 4,717,216 | A * | 1/1988 | Hornak | 312/326 |
| 4,850,657 | A * | 7/1989 | Placke et al. | 361/679.43 |
| 4,901,205 | A * | 2/1990 | Landis et al. | 361/818 |
| 5,013,105 | A * | 5/1991 | Rossum, Jr. | 312/263 |
| 5,197,789 | A * | 3/1993 | Lin | 312/223.2 |
| 5,207,342 | A * | 5/1993 | Tsuji et al. | 220/4.02 |
| 5,369,549 | A * | 11/1994 | Kopp et al. | 312/263 |
| 5,398,833 | A * | 3/1995 | Klauss et al. | 220/4.02 |
| 5,743,606 | A * | 4/1998 | Scholder | 312/223.2 |
| 5,835,346 | A * | 11/1998 | Albani et al. | 361/679.4 |
| 6,024,426 | A * | 2/2000 | Korinsky et al. | 312/223.2 |
| 6,038,126 | A * | 3/2000 | Weng | 361/679.01 |
| 6,041,956 | A * | 3/2000 | Kao | 220/4.02 |
| 6,373,692 | B1 * | 4/2002 | Cheng | 361/679.59 |
| 6,661,677 | B1 * | 12/2003 | Rumney | 361/818 |
| 6,726,295 | B2 * | 4/2004 | Searby | 312/223.2 |
| 6,909,047 | B2 * | 6/2005 | Zhang | 174/50 |
| 6,968,958 | B2 * | 11/2005 | Lauchner et al. | 211/26 |
| 7,125,272 | B1 * | 10/2006 | Liang | 439/160 |
| 7,179,991 | B2 * | 2/2007 | Chen et al. | 174/50 |
| 7,527,163 | B2 * | 5/2009 | Miyamoto | 220/4.02 |
| 2007/0075613 | A1 * | 4/2007 | Mau | 312/223.2 |

* cited by examiner

Primary Examiner—Anthony Stashick
Assistant Examiner—Christopher B McKinley
(74) Attorney, Agent, or Firm—Guice Patents PLLC

(57) ABSTRACT

A modular case assembly device including:
a lower case, wherein a front wall and a rear wall protrude from a bottom plate respectively, and a left wall and a right wall protrude from left and right sides of the bottom plate respectively, and protruding pieces are punched out from upper edges of the left and right walls;
an upper case structured from an upper plate and left and right side wall plates; and
resilient springs, each of which is formed a press portion, a through hole and a connecting portion are further respectively formed of the press portion;

The protruding pieces of the lower case transversally cross and rest atop the position fixing portions, which assist in increasing stability of the assembled upper case and lower case, and effectively provide convenient and fast assembly and disassembly.

8 Claims, 8 Drawing Sheets

MODULAR CASE ASSEMBLY DEVICE

BACKGROUND OF THE INVENTION (a) Field of the Invention

The present invention relates to a modular case assembly device, and more particularly to a modular case designed for use in a computer to effectively provide convenient and fast assembly and disassembly of an upper case and lower case, and which increases stability when assembled.

(b) Description of the Prior Art

A prior invention of the inventor of the present invention is Taiwan utility model No. 090217902, entitled "Connecting Device for a Cover of a Computer Host Case", which although practical, however, because the number of fastener interfaces is limited, thus, stability of the fasteners is still inadequate when used on relatively large cases.

Thus, it is a feature of the present invention to provide an assembly device that is able to effectively provide rapid assembly and disassembly of an upper case and lower case, and which increases stability when assembled.

SUMMARY OF THE INVENTION

The primary objective of the present invention is to provide a modular case assembly device that increases stability of an assembled upper case and lower case, and effectively achieve convenient and fast assembly and disassembly of the modular case.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
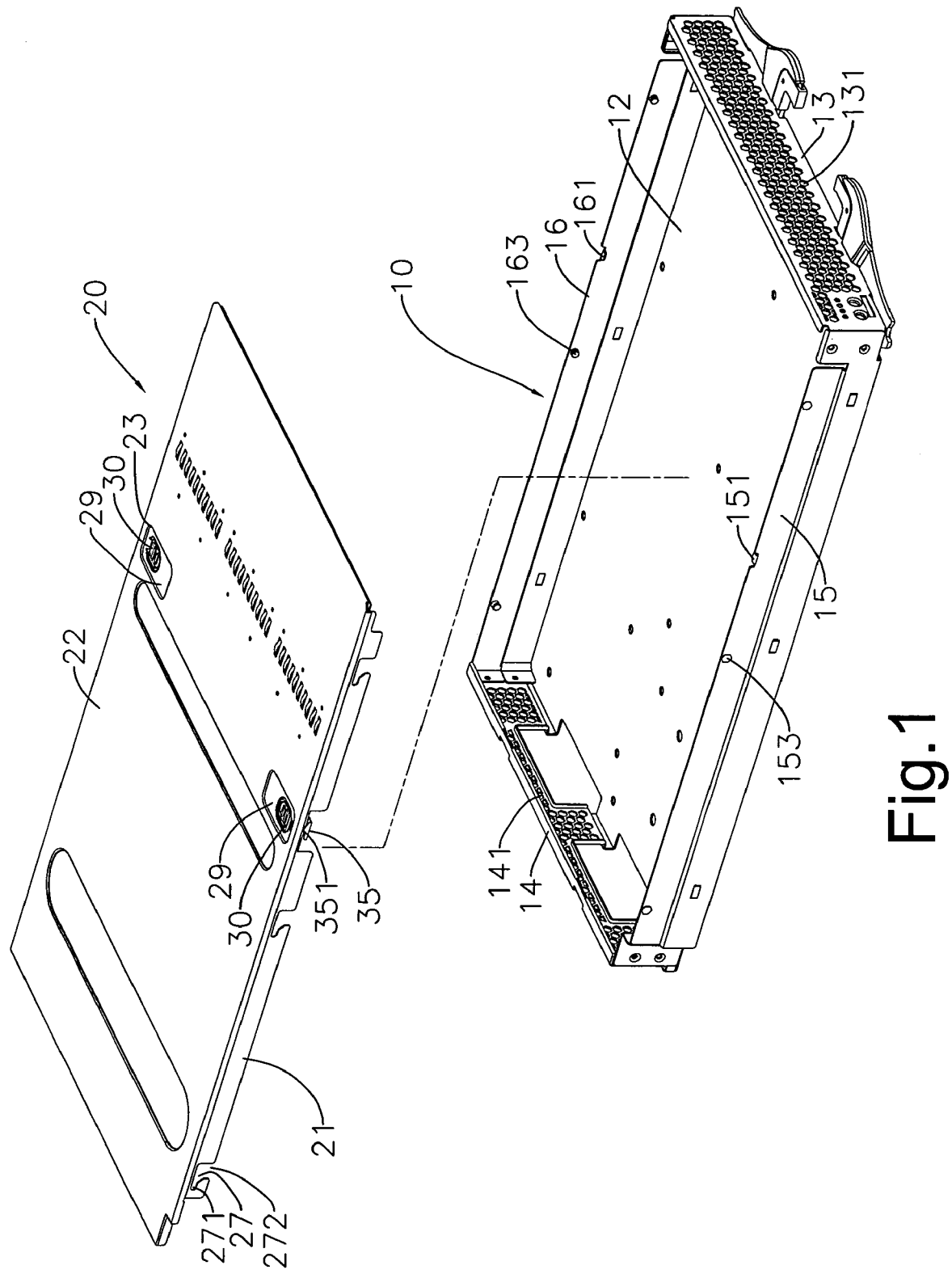
FIG. 1 shows an exploded elevational view of a lower case and an upper case according to the present invention.
Figure 2:
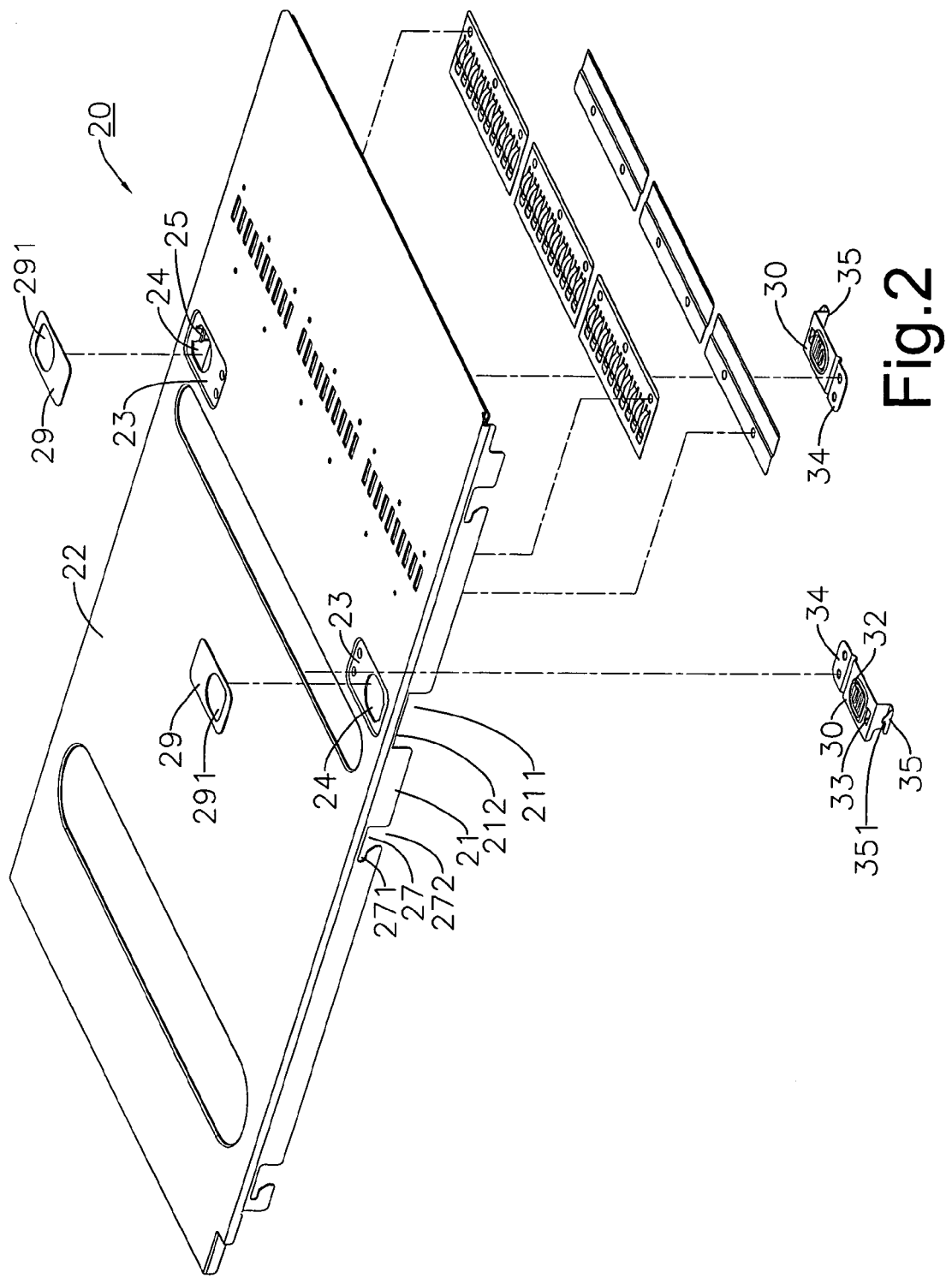
FIG. 2 shows an exploded elevational view of the upper case according to the present invention.
Figure 3:
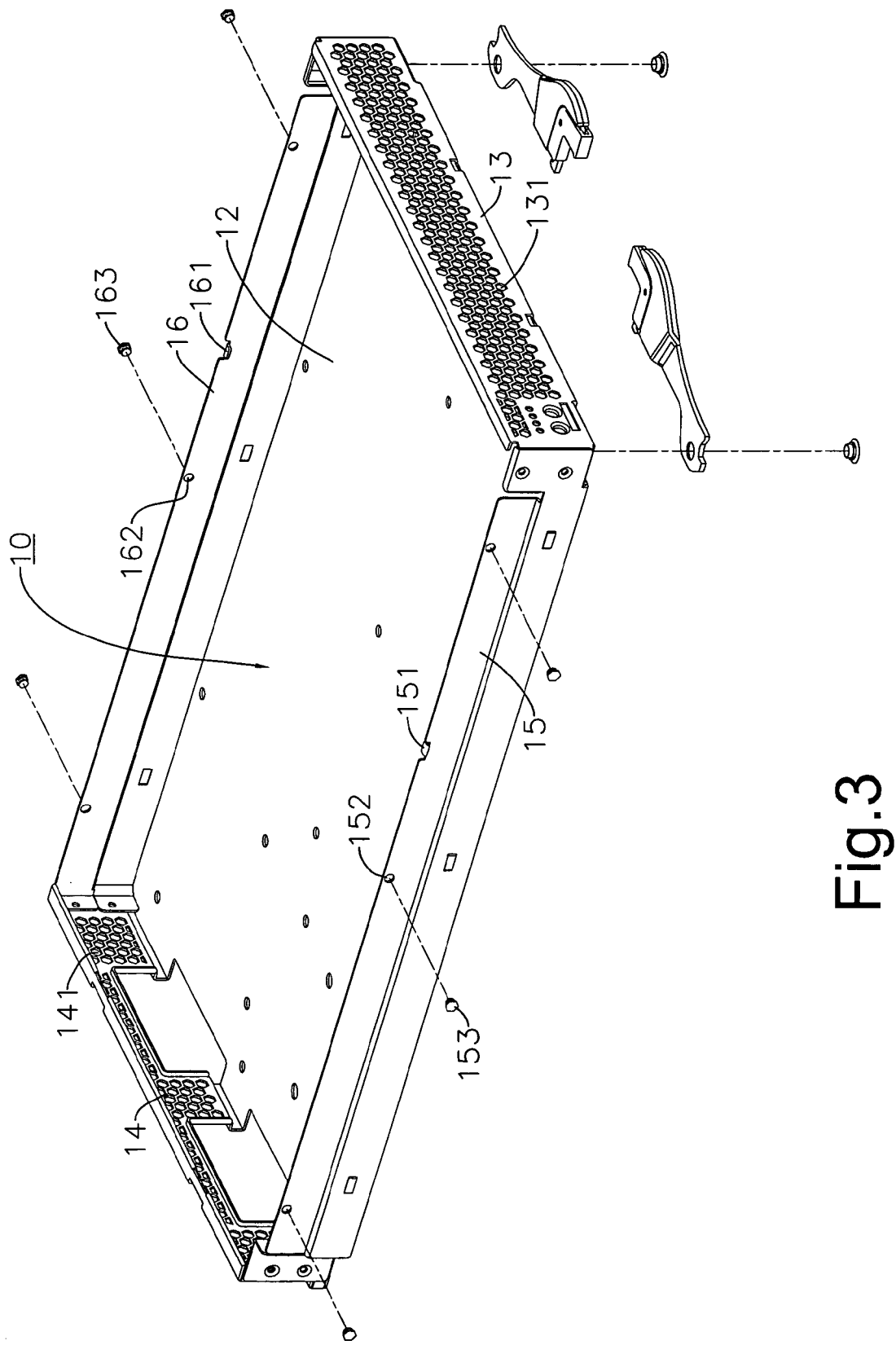
FIG. 3 shows an exploded elevational view of the lower case according to the present invention.
Figure 4:
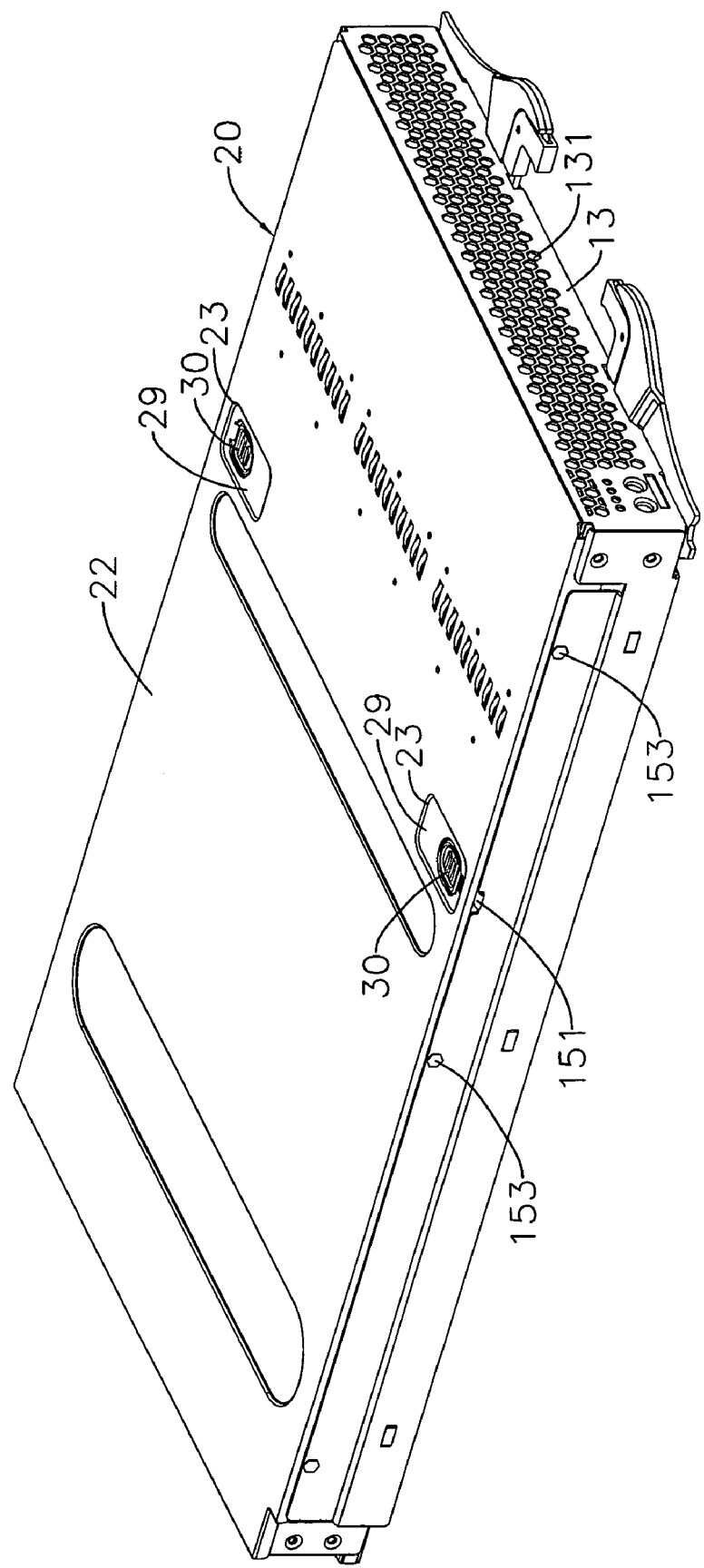
FIG. 4 shows an assembled elevational view according to the present invention.

Referring to FIGS. 1, 2, 3 and 4, which show the modular case assembly device of the present invention comprising:

a lower case 10 (see FIG. 1), wherein a front wall 13 and a rear wall 14 protrude from a front end and a rear end of a bottom plate 12 respectively, a left wall 15 and a right wall 16 protrude from left and right sides of the bottom plate 12 respectively;

transverse protruding pieces 151 and 161 punched out from upper edges of the left and right walls 15 and 16 respectively;

an upper case 20 (see FIG. 2) structured from an upper plate 22 and left and right side wall plates 21, (21), wherein rectangular depressions 23, (23) are respectively defined on a top surface of the upper plate 22, a through hole 24 is punched out of each of the rectangular depressions 23, (23), and a longitudinally extended crosspiece 25 is formed on an edge of each of the through holes 24;

resilient springs 30, on a surface of each of which is formed a press portion 32, a through hole 33 and a connecting portion 34 are further respectively formed on sides of the press portion 32, a hook 35 extends from a side of the through hole 33, and an arc-shaped protrusion 351 and a horizontal position fixing portion 352 are formed on an upper end of the hook 35; the connecting portion 34 affixes to a bottom surface of each of the depressions 23, (23).

Figure 5:
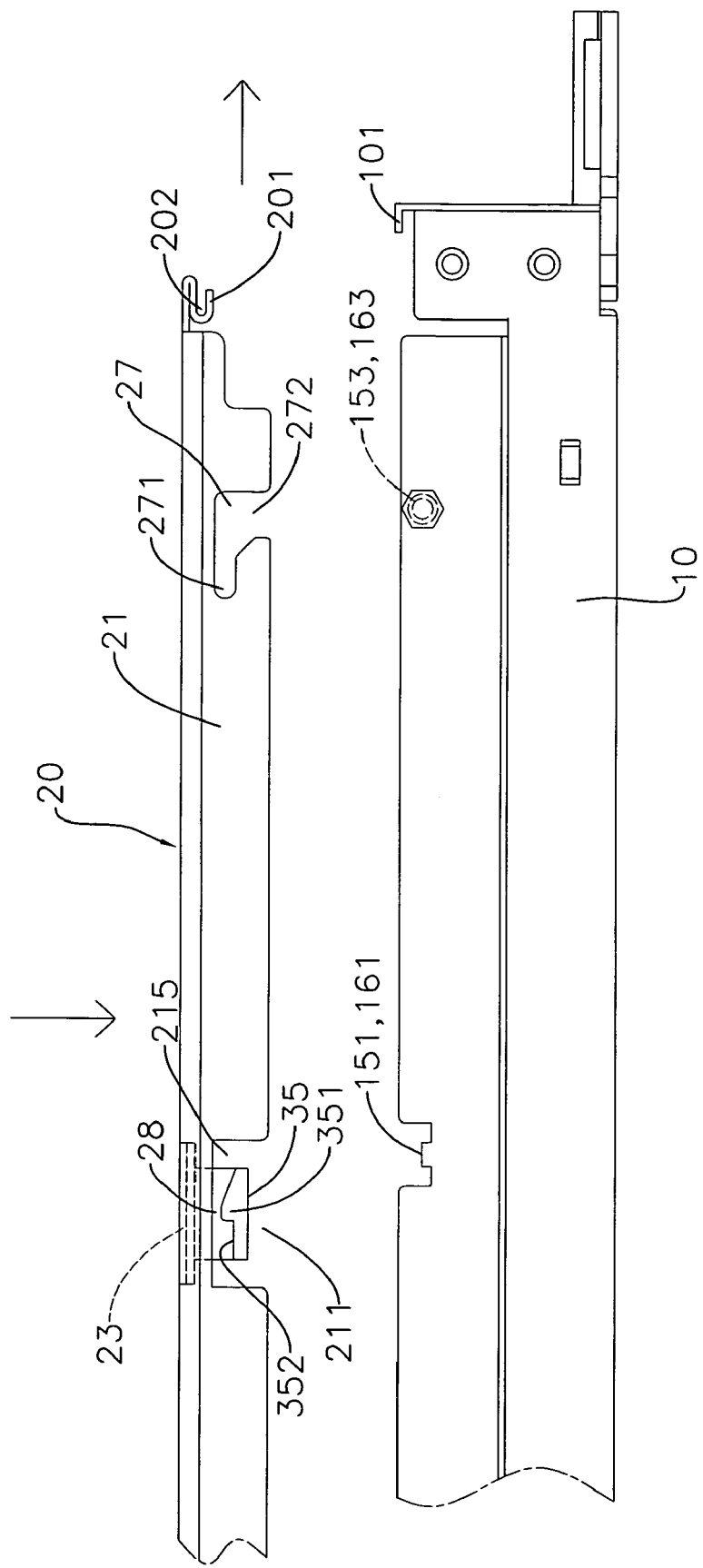
FIG. 5 shows a side view depicting assembly of the upper case and the lower case according to the present invention.

Indentations 211 are defined in the left and right side wall plates 21, (21) and are positioned at an underside of each of the through holes 24, and a clearance 28 is formed between the arc-shaped protrusion 351 and a top edge 212 of the indentation 211 (see FIG. 5).

The protruding pieces 151, 161 of the lower case 10 transversally cross the clearances 28 and rest atop the position fixing portions 352.

According to the aforementioned characteristics, at least more than one groove 27 is positionally defined in the left and right side wall plates 21, (21) of the upper case 20, and a transverse position fixing groove 271 is formed in an interior of each of the grooves 27, and an indentation 27 is formed on an exterior of each of the grooves 27. Two or more joining holes 152, 162 are defined in the left and right walls 15, 16 of the lower case 10 respectively, which are used to hold fast shafts 153, 163 that embed into the grooves 27.

According to the aforementioned characteristics, a lower protruding piece 201 extends from an underside of a front end of the upper case 20, and a groove 202 is formed between the lower protruding piece 201 and the upper plate 202. A horizontally inwardly extending protruding plate 101 is formed at a front end of the lower case 10, which enables the lower protruding piece 201 to extend underneath the protruding plate 101, thereby clasping the protruding piece 101 within the groove 202.

According to the aforementioned characteristics, an outer cover 29 covers and is affixed within each of the depressions 23. Each of the outer covers 29 is provided with a right through hole 291 that opens onto the through hole 24 of the depression 23, (23).

According to the aforementioned characteristics, the through hole 33 defined in each of the springs 30 provides for the crosspiece 25 to penetrate therethrough.

According to the aforementioned characteristics, the front and rear walls 13, 14 of the lower case 10 are provided with meshes 131 and 141 respectively.

According to the aforementioned characteristics, a surface of each of the press portions 32 is a rough surface.

According to the aforementioned characteristics, each of the horizontal position fixing portions 352 is formed at a side of each of the hooks 35 and is positioned at a rear side of the arc-shaped protrusion 351.

Figure 6:
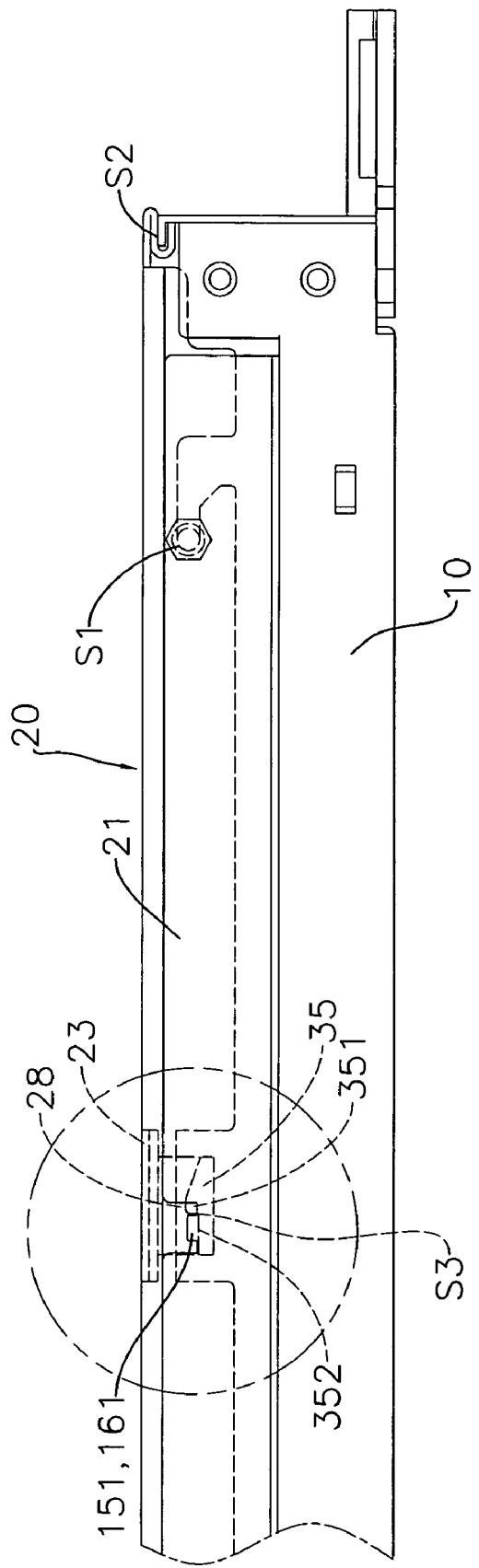
FIG. 6 shows a side view depicting assemblage of the upper case and the lower case according to the present invention.
Figure 7:
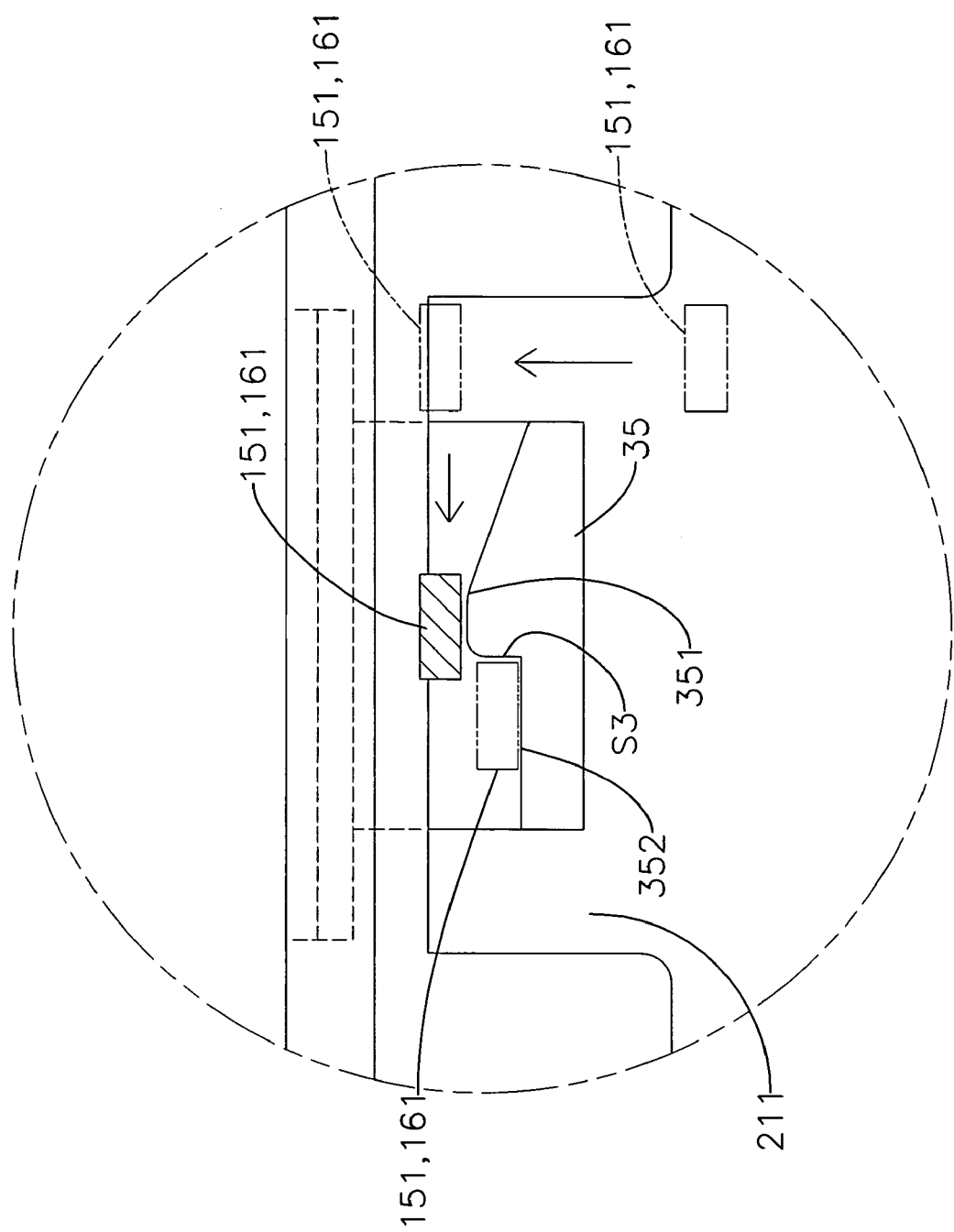
FIG. 7 shows an enlarged schematic view of area A of FIG. 6.

Referring to FIG. 5, which shows a side schematic view of an upper case 20 being inserted into a lower case 10 according to the present invention, wherein a user first holds the upper case 20 and aligns indentations 272 of grooves 27 with shafts 153, 163 in order to embed the shafts 153, 163 into the respective grooves 27. Holding grooves 215 are formed between front ends of hooks 35 and edges of indentations 211 of side wall plates 21, which enable disposition of protruding pieces 151, 161 therein. Horizontal linear displacement of the upper case 20 enables a protruding plate 101 to be clasped within a groove 202, and the shafts 153, 163 respectively displace into position fixing grooves 271 to form first clasp interfaces S1 (see FIG. 6). At the same time, the protruding pieces 151, 161 are horizontally displaced, thereby causing them to pass over clearances 28. Each of the hooks 35 is part of a spring 30 having flexible restoring characteristics, and thickness of each of the protruding pieces 151, 161 can be less than or slightly greater than the width of the clearances 28. When the thickness of each of the protruding pieces 151, 161 is less than the width of the clearances 28, the hooks 35 will not deform. However, when the thickness of the protruding pieces 151, 161 is slightly greater than the width of the clearances 28, then the hooks 35 resiliently deform, thereby increasing the size of the clearances 28 to enable the relatively thicker protruding pieces 151, 161 to cross over, whereafter the hooks 35 resiliently restore their original form, thereby enabling the clearances 28 to resume their original size. The protruding pieces 151 and 161 are positioned on horizontal position fixing portions 352 (see FIG. 7), and side edges of the protruding pieces 151, 161 come in contact with side wall edges of arc-shaped protrusion 351 to form third clasp interfaces S3. Referring to FIG. 6, which shows the upper case 20 and the lower case 10 assembled according to the present invention and provided with three clasp interfaces, including the first and third clasp interfaces S1, S3 and a second clasp interface S2 of the protruding plate 101 clasped into the groove 202. With such a clasp positioning configuration of the three clasp interfaces S1, S2 and S3, stability of the assembled upper case 20 and lower case 10 is increased and undue application of force will not result in the possibility of inappropriate displacement of the upper case 20 on the lower case 10.

Figure 8:
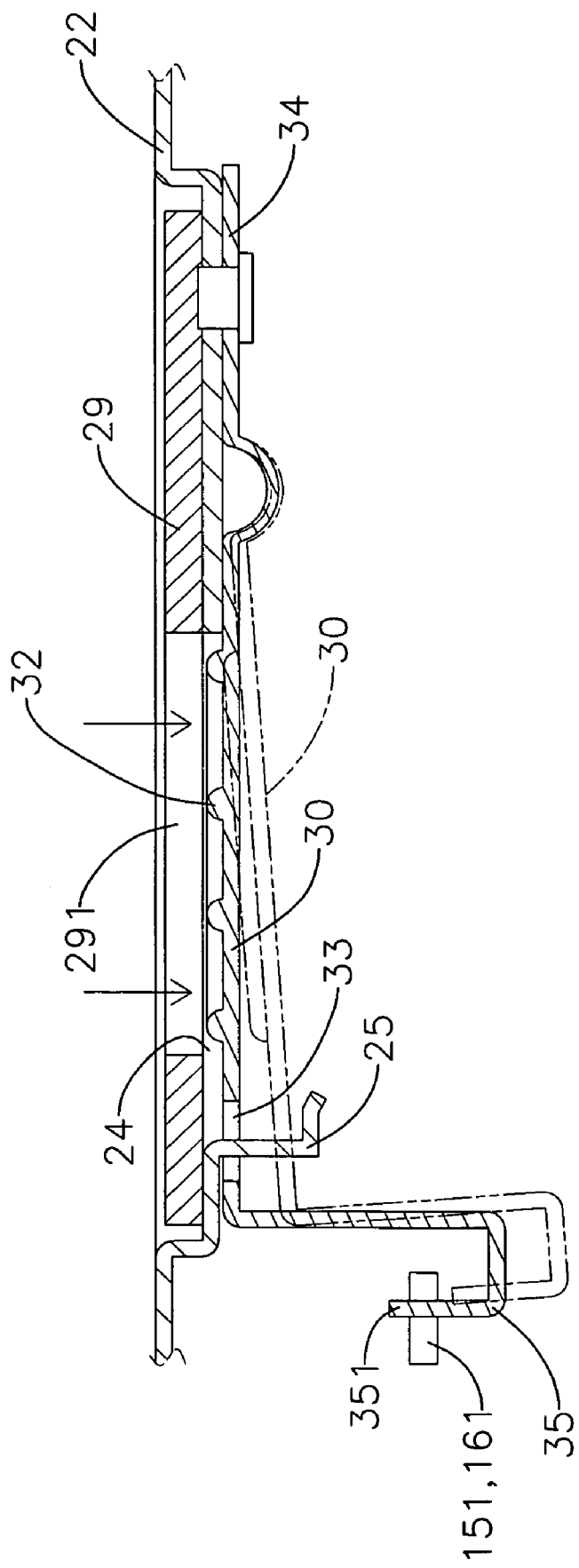
FIG. 8 shows a cross-sectional view depicting a spring being resiliently deformed when pressed according to the present invention.

Referring to FIG. 8, when disassembling the upper case 20 from the lower case 10, the user only needs to separately press portions 32 positioned within depressions 23 with his fingers to force down the press portions 32 and resiliently deform the springs 30 downward about fixed ends of connecting portions 34 connected to the depressions 23, thereby causing the springs to form an angle with the upper case 20. In order to prevent too great a deformation in the springs 30 when pressed down, the springs 30 abut against crosspieces 25 upon reaching dead points. The clearances 28 are enlarged after the springs 30 have been pressed down and resiliently deformed, and the user then holds a section of the upper case 20 with his other fingers to push and horizontally displace the upper case 20 towards the rear, thereby displacing the protruding pieces 151, 161 from the corresponding clearances 28, and causing them to be positioned within the holding grooves 215, and the shafts 153, 163 are positioned in the indentations 272. After the protruding plate 101 separates from the groove 202, then the entire upper case 20 can be smoothly and quickly removed from the lower case 10. Pressure on the springs 30 is relieved after separating the upper case 20 from the lower case 10, and the springs 30 rapidly reposition, thereby restoring the clearances 28 to their original state prior to the press portions 32 being pressed.

Disposition of meshes 131, 141 on front and rear walls 13, 14 of the lower case 10 improves ventilation and heat dissipation and enables airing of electronic components within the lower case 10 (not shown in the drawings).

Each of the press portions 32 is designed with a rough surface to prevent when being pressed by the fingers of the user or an implement.

An outer cover 29 covers each of the depressions 23 to improve regularity of the external appearance of the modular case.

In conclusion, the present invention achieves rapid and convenient assembly and disassembly of the upper case 20 and the lower case 10, moreover, stability of the assemblage is improved, and practicability and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A modular case assembly device comprising:

a lower case, wherein a front wall and a rear wall protrude from a front end and a rear end of a bottom plate respectively, and a left wall and a right wall protrude from left and right sides of the bottom plate respectively, transverse protruding pieces are punched out from upper edges of the left and right walls;

an upper case structured from an upper plate and left and right side wall plates, wherein rectangular depressions are respectively defined on a top surface of the upper plate, a through hole is punched out of each of the rectangular depressions, and a longitudinally extended crosspiece is formed on an edge of each of the through holes; and resilient springs, a press portion is formed on a surface of each of the resilient springs, a through hole and a connecting portion are further respectively formed on sides of the press portion, a hook extends from a side of the through hole, and an arc-shaped protrusion and a horizontal position fixing portion are formed on an upper end of the hook; the connecting portion affixes to a bottom surface of each of the depressions;

each of the left and right side wall plates has an indentation positioned at an underside of each of the through holes, and a clearance is formed between the arc-shaped protrusion and a top edge of each indentation;

the protruding pieces of the lower case transversally cross the clearances and rest atop the position fixing portions.

2. The modular case assembly device according to claim 1, wherein at least more than one groove is defined in the left and right side wall plates of the upper case, a transverse position fixing groove is formed in an interior of each of the grooves forms, and an indentation is formed on an exterior of each of the grooves; two or more joining holes are defined in the left and right walls of the lower case, which are used to hold fast shafts that embed into the grooves.

3. The modular case assembly device according to claim 1, wherein a lower protruding piece extends from an underside of a front end of the upper case, and a groove is formed between the lower protruding piece and the upper plate; a horizontally inwardly extending protruding plate is formed at a front end of the lower case, which enables the lower protruding piece to extend underneath the protruding plate, thereby clasping the protruding piece within the groove.

4. The modular case assembly device according to claim 1, wherein an outer cover covers and is affixed within each of the depressions, and each of the outer covers is provided with a right through hole that opens onto the through hole of the depression.

5. The modular case assembly device according to claim 1, wherein the through hole defined in each of the springs enables the crosspiece to penetrate therethrough.

6. The modular case assembly device according to claim 1, wherein the front and rear walls of the lower case are provided with meshes.

7. The modular case assembly device according to claim 1, wherein a surface of the press portion is a rough surface.

8. The modular case assembly device according to claim 1, wherein the horizontal position fixing portion is formed at a side of each of the hooks and is positioned at a rear side of the arc-shaped protrusion.

\* \* \* \* \*